Feb. 13, 1940.  C. N. WINDECKER ET AL  2,189,826

AMMONIA SODA PROCESS

Filed Feb. 21, 1938 — 3 Sheets-Sheet 2

INVENTOR.
C.N. Windecker
BY R.E. Windecker
Hull Brock & West
ATTORNEY.

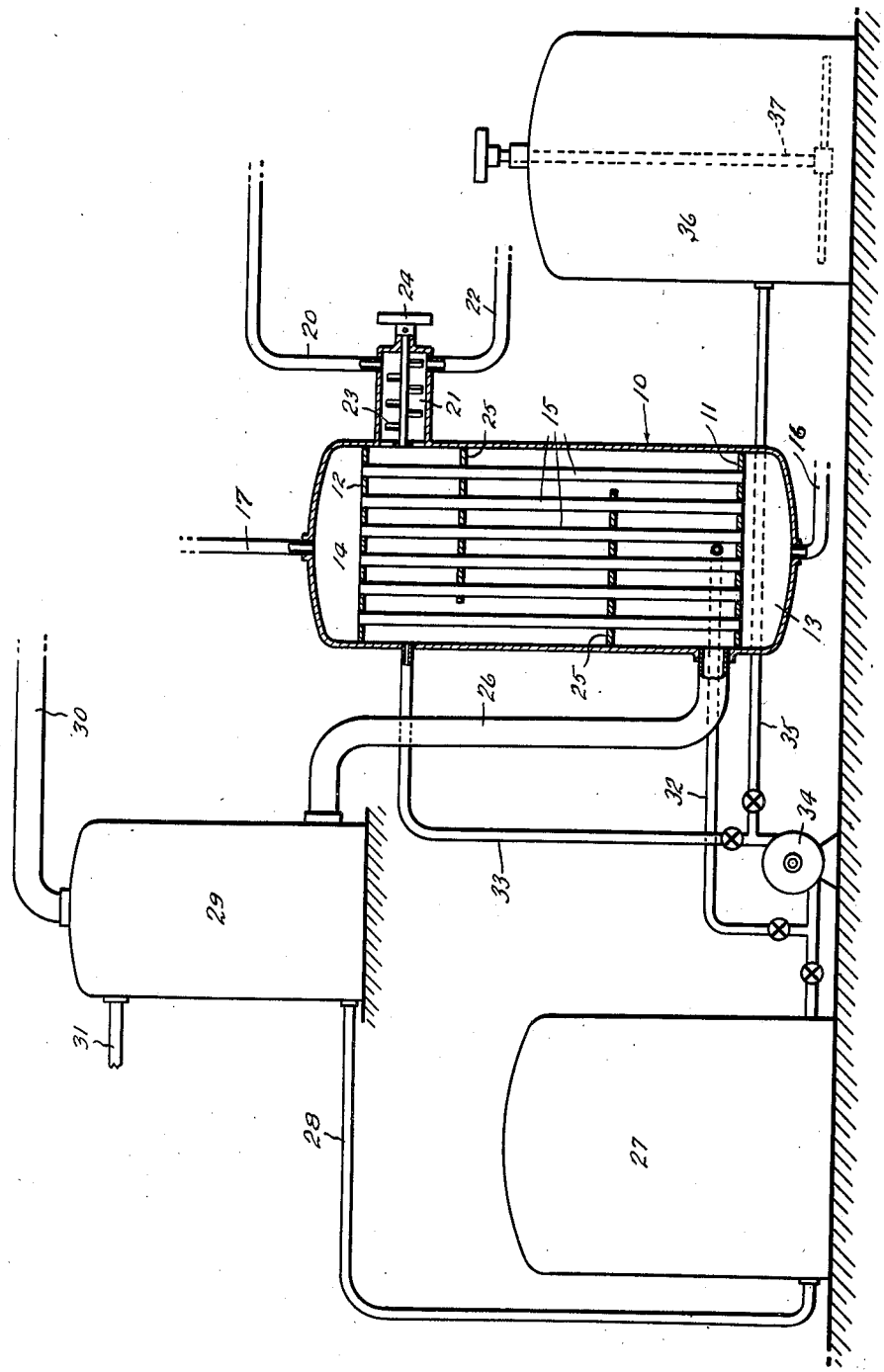

Patented Feb. 13, 1940

2,189,826

UNITED STATES PATENT OFFICE 2,189,826

AMMONIA SODA PROCESS

Clifton N. Windecker and Robert E. Windecker, Painesville, Ohio; Robert Erwin Windecker, Irene W. Alonso, and Charles Edward Windecker executors of said Clifton N. Windecker, deceased Application February 21, 1938, Serial No. 191,732

5 Claims. (Cl. 23—65)

This invention relates to an ammonia soda process and has for its object to provide a process which will effect important economies over the standard ammonia-soda process as generally practiced. More specifically, the object is to provide for ammonia carbonation partly in a peculiarly efficient gas phase reaction, requiring but little power and partly in a separate liquid-gas contact reaction. A more limited object is to make practical the use of a cheaply produced lime kiln gas which is relatively high in inert gas content as a source of at least part of the carbon dioxide in the gas phase reactions, and using mainly the substantially pure, recovered carbon dioxide gas in the liquid-gas contact reaction.

Stated in a somewhat more limited way, the object is to provide for the formation of solid ammonium carbonate and/or carbamate in a gas phase reaction and for then utilizing the same to produce sodium bicarbonate in a liquid gas contact reaction with sodium chloride in solution.

A further object is to provide for a continuous ammonia soda process capable of attaining the above objects and involving alternate use of two reaction chambers or sets of reaction chambers for the production of ammonium carbonate and/or carbamate by a gas phase reaction resulting in deposit of the reaction product in solid form in the chambers, the deposit in one reaction chamber being removed by dissolving in brine while a deposit is being formed in the other.

A further object is to provide for carrying out the ammonia distillation partly in a heater section adapted to decompose carbonates (principally ammonium bicarbonate) and partly in a lime section adapted to recover the ammonia from ammonium chloride and passing the evolved gases from the heater section and from the lime section to separate gas phase carbonators whereby the excess $CO_2$ from the heater over that required to react with the ammonia from the heater in the formation of ammonium carbonate (a strong gas), being freed of ammonia, can be passed to the bicarbonator thereby reducing, and, if sufficient care is exercised, nearly eliminating the need for supplementary $CO_2$ from the lime kiln to the bicarbonator. (This object is achieved in the variant form illustrated in Fig. 2.)

Figure 1:
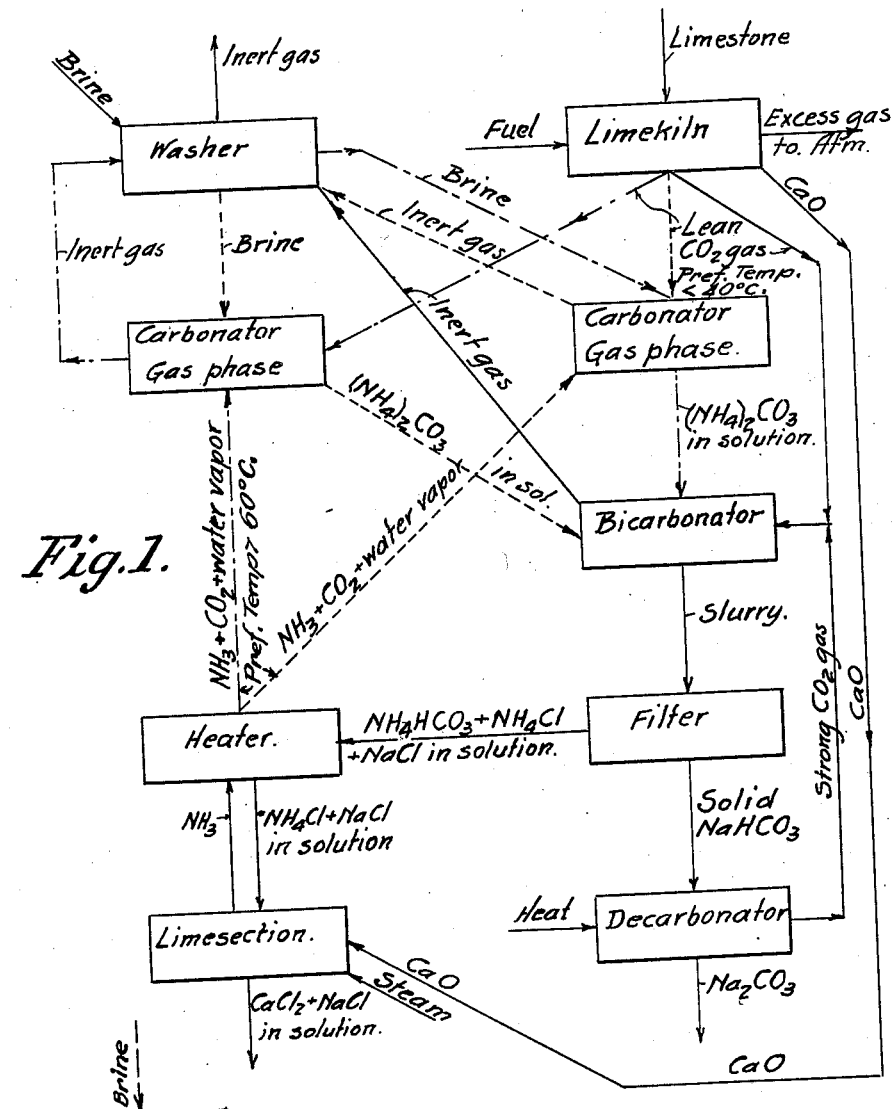
Figure 2:
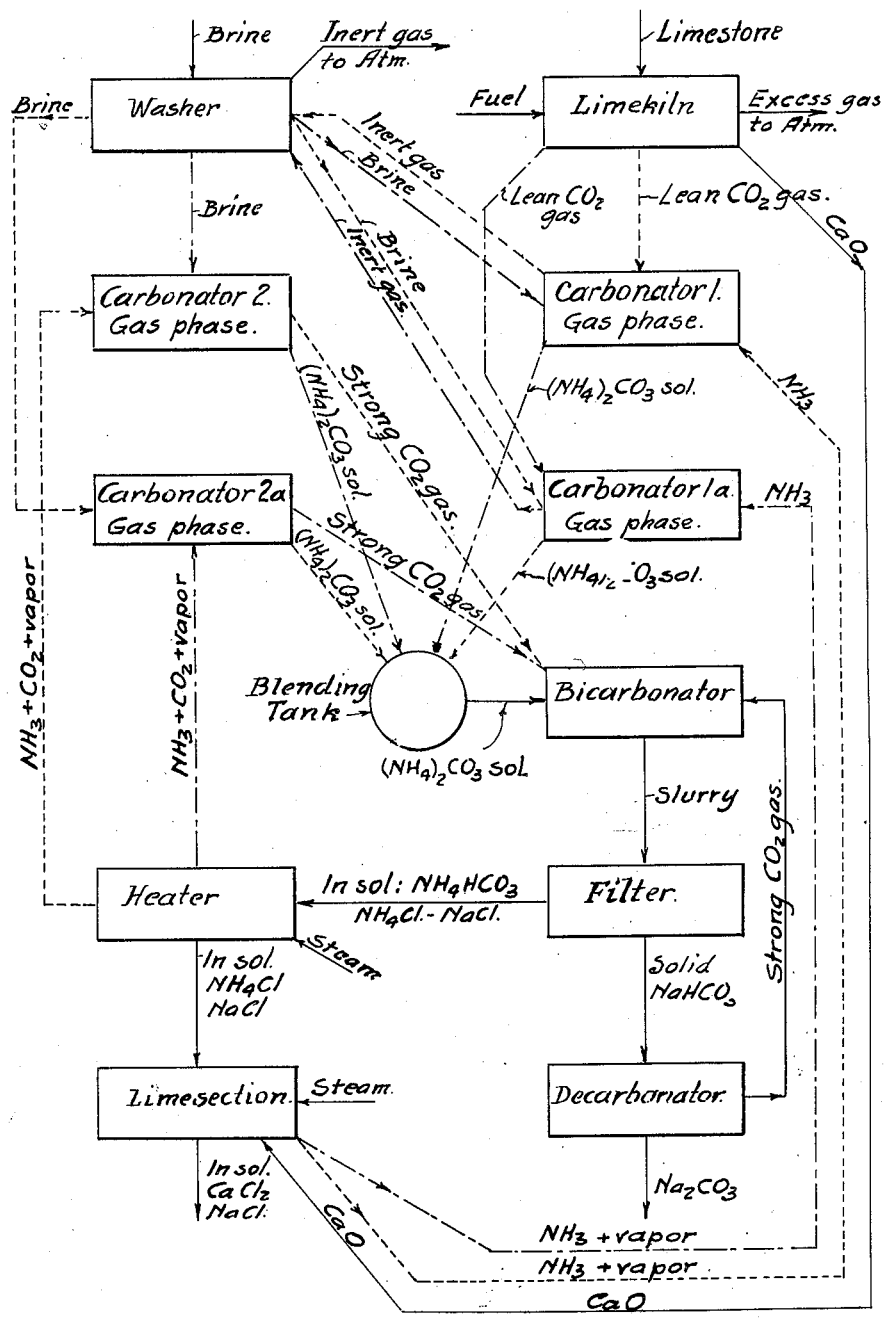

Other and more limited objects will be in part apparent and in part pointed out hereinafter, reference being had to the accompanying drawings wherein Fig. 1 is a flow diagram of an ammonia soda process embodying the invention, that part of the flow which is constant being indicated by full lines and the intermittent flow being illustrated in broken lines. By disregarding the dotted lines, and regarding only the full lines and the dot-and-dash lines, the flow will be seen complete for one portion of the cycle, and by disregarding the dot-and-dash lines and having regard only to the full lines and dotted lines the flow will be seen complete for the other portion of the cycle; Fig. 1ª is a fragment of a flow diagram similar to that of Fig. 1 but differing in that gases from the heater and lime section are returned to the carbonator through separate pipes both of which contain $NH_3$ but only one of which contains $CO_2$, that portion of the diagram which is not shown being identical with the showing of Fig. 1; Fig. 2 is a similar flow diagram illustrating a variant form of the invention, differing from that shown in Fig. 1 principally in that gases from the heater section of the ammonia distillation apparatus and the lime section thereof are returned to separate pairs of gas phase carbonators whereby the excess strong $CO_2$ from the heater section is freed from ammonia and passed to the bicarbonator; and Fig. 3 is a schematic showing of one of the gas phase carbonators indicated in Figs. 1 and 2 and showing the connections to the washer, storage tank, etc.

In present practice the $CO_2$ gas is absorbed in ammoniated brine and reacts with $NH_3$. The rate and extent of the $CO_2$ absorption increases with the pressure of the mixed gas and also with the percentage of $CO_2$ in the gas. For this reason and because of the construction of the equipment employed, it is usual in present practice to compress the gases to from 2¼ to 3 atmospheres absolute, and it is therefore desirable to use a kiln gas, rich in $CO_2$, the production of which has been expensive, requiring coke for fuel and selected sizes of stone and coke.

In our process the first half of the ammonia carbonation is carried out in the gas phase, and the necessity for rich gas and high pressures is obviated. In the second half of the carbonation, in which ammonium bicarbonate is formed, rich $CO_2$ gas is used, which, because of the relatively small volume, requires comparatively little power for compression. Since a gas with relatively low $CO_2$ content can be utilized in the gas phase reaction, cheap fuels, cheaper grades of limestone and cheaper burning methods can be employed; and, since high pressure is not necessary in the gas phase reaction, important savings in power may be realized.

In carrying out our process, which we will now describe more in detail, we bring together carbon dioxide preferably in the form of lime kiln gas and recovered ammonia, all gases which contain both ammonia and CO₂, even though one thereof is present only in small quantity, being kept at a temperature high enough to avoid plugging of pipes by solid ammonium carbonate. Gases containing both ammonia and carbon dioxide, may be circulated through pipes at a temperature as low as 60° C. but it is preferable to operate at least a few degrees above that temperature.

Another important consideration is the quantity of water in the system. In the practice of the ammonia soda process it is desirable to keep the water content as low as possible in order to increase the efficiency. To this end, the brine employed is as nearly saturated as practically possible. In our process, we are able to introduce 0.53 pound of water for each pound of ammonia, reacting to form carbonate, without diluting the brine, since that amount of water is required to form ammonium carbonate from NH₃, CO₂ and H₂O. Water is introduced by way of gases derived from the heater and lime section of the ammonia distiller and by way of kiln gas. The practical way of controlling the moisture content of these gases is to control their temperature. Since some pipes carry gases containing both NH₃ and CO₂, their temperature cannot well be reduced below 60° C. Gases in other pipes, however, can have their moisture content decreased by lowering their temperature. It is convenient to cool such pipes to 40° C. in summer and lower in winter. In accordance with our process as illustrated in Fig. 1, a temperature of 40° C. for the kiln gases and 63° C. for the gases from the ammonia distiller will result in the introduction of .450 pound of H₂O per pound of NH₃. This is less than the .530 pound required to form all carbonate in the carbonators and some carbamate will be formed. When this is dissolved in the brine, it not only will not be diluted but the carbamate will take up water to form carbonate assisting practically in keeping up the brine concentration. In the case illustrated in Fig. 1ᵃ, the gas from the lime section can be cooled even below 40° C. whereby a greater proportion of carbamate will be formed. In the case illustrated in Fig. 2, by controlling the temperature of the gases from the heater to about 63° C. and the gases from the like kiln and the lime section to about 40° C., a proportion of carbamate is formed, with the result that the brine is not diluted but actually concentrated. The mixture of these gases at the proper temperature, as indicated above, is passed into a reaction chamber which may take the form shown in Fig. 3 where it contacts surfaces which are cooled to a suitably low temperature whereby solid ammonium carbonate or carbamate or a mixture thereof is deposited in the reaction chamber. It should be understood that the reaction takes place when the mixed gases are cooled to below about 60° C. and that the solids formed may be deposited on the cooling surfaces or on other surfaces or even to a small extent carried away with the inert gases as dust, and caught in the brine washer. We have found that a deposit of quite considerable thickness, for example, a quarter of an inch or more may be thus formed on the cooled surfaces, the reaction product having fairly good heat conducting properties. Only enough power is required to pass the gases through the reaction chamber and a low grade source of carbon dioxide may be employed, the inert gases merely passing through unreacted. We prefer to use a proportion of kiln gas and ammonia gases returned from the process, and therefore containing some CO₂, (supplemented by enough ammonia to compensate for losses) such that the carbon dioxide is present slightly in excess of the theoretical amount required to react with the ammonia present to form ammonium carbonate. We have found that nearly all the ammonia will be combined with CO₂ to form solid ammonium carbonate or carbamate, even in the presence of a large proportion of inert gases, and but very little washing will be required to remove any remaining trace of ammonia in the exit gases. Such ammonia as does pass through the reaction chamber into the washer will be absorbed therein by sodium chloride brine and the inert gases will be vented to the atmosphere by a suitable pump.

After a suitable amount of deposit is formed in the reaction chamber, the brine from the washer (a substantially saturated sodium chloride solution) is admitted thereto and dissolves the reaction product forming a solution of ammonium carbonate. This solution is conveyed to storage tanks, which are equipped with agitators to prevent formation and settling of large crystals, and where any desired adjustment of ammonia content can be made. This liquor is now admitted into a cooled bicarbonator and there treated with carbon dioxide with agitation, the carbon dioxide being derived as far as possible from the decarbonating furnace and augmented so far as necessary by kiln gas or strong gas from some other source. In this bicarbonator, the ammonium carbonate combines with carbon dioxide and forms ammonium bicarbonate which, being in the presence of sodium chloride, reacts to form sodium bicarbonate and ammonium chloride.

The resulting mixture, containing sodium bicarbonate in suspension, is filtered and the sodium bicarbonate is passed to the decarbonating furnace while the solution containing ammonium chloride, with smaller proportions of ammonium bicarbonate and unreacted sodium chloride is passed to the ammonia distiller. From the decarbonating furnace the desired end product, sodium carbonate, is obtained, while the carbon dioxide of high purity is passed to the cooled bicarbonator for conversion of ammonium carbonate to ammonium bicarbonate as previously explained. In the ammonia distiller the ammonium bicarbonate is decomposed by heat, yielding ammonia gas and CO₂, and the ammonium chloride is reacted upon by lime, forming calcium chloride and releasing ammonia. The gases, consisting principally of ammonia, are passed through a suitable cooler (or coolers Fig. 1ᵃ and Fig. 2) and then to the reaction chambers for the formation of ammonium carbonate and/or carbamate as previously explained.

In the flow diagrams we have shown the flow between the various units of the apparatus employed, indicating how the process is made continuous by using two reaction chambers alternately, each being used in turn for the formation of a deposit and for the dissolving thereof in the brine. (See brief description of Fig. 1 for explanation of broken lines.) Except insofar as the contrary is indicated herein, apparatus of known construction may be used. The apparatus constituting the cooled reaction chambers employed herein is illustrated in Fig. 3.

From Fig. 3 it will be seen that we employ a tank or receptacle 10 provided with partitions 11 and 12 defining, with the portions of the tank proper, spaces 13 and 14. These spaces are connected by a plurality of tubes 15 whereby cooling water may be passed for example from the pipe 16 to the space 13, through the pipes 15, to the space 14 and out through the pipe 17.

The kiln gas may enter through a pipe 20 into the interior of a mixing chamber 21 which at the same time receives ammonia from the ammonia distiller through the pipe 22. Mixing is effected in the chamber 21 by a rotating mixing element 23 driven through a pulley 24 or may be effected by any other suitable means. The mixture of gases then passes into the unit 10 where it is caused by the baffles 25 to follow a tortuous path toward the bottom thereof from which it may pass through a pipe 26 into the washer 29. It is to be understood that any number of units may be employed in series or in parallel depending upon the rate of flow of gases and other factors, such as are required to cause substantially complete reaction of the ammonia. The inert gases and the excess of $CO_2$ pass through sodium chloride brine in the washer 29 and under the influence of a suitable pump out through the pipe 30 to the atmosphere. Any traces of ammonia in the gases is absorbed by the brine which is supplied through a suitable pipe 31 and drained through pipe 28 to reservoir 27. When the carbonator of Fig. 3 has been used for the gas phase reaction for such a time as to produce a deposit of suitable amount, the gas supply is shut off by suitable valve mechanism (not shown) and brine from the washer is admitted from the brine-reservoir 27 and pipe 33 to the interior of the unit 10 where it comes into contact with the deposit therein and dissolves the same. The rate of dissolving is, in the preferred mode of operation, increased by circulating the brine through the chamber. This circulation is effected by withdrawing it through pipe 32 to pump 34 and again delivering it to unit 10 through pipe 33. When the deposit is completely dissolved in the brine, the resulting brine solution is drawn off through pipes 32 and 35 by the pump 34 and delivered either to a tank 36, equipped with an agitator 37, or directly to the bicarbonator where it is treated with carbon dioxide of high purity derived principally from the decarbonator.

Figure 1A:
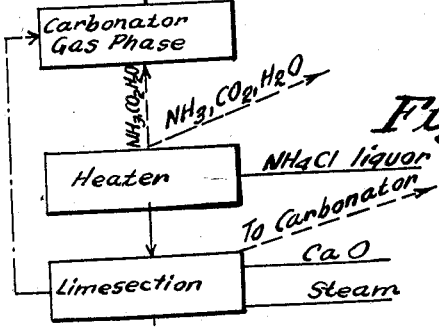

It will be understood that substantially the gas phase carbonator just described is employed wherever the flow diagram indicates a gas phase carbonator in the variant forms of the invention illustrated in Figs. 1a and 2 as well as in the form illustrated in Fig. 1.

Referring now to Fig. 1, it will be seen that fuel and limestone, both of which are productive of carbon dioxide and water vapor, are fed to the lime kiln, a lean carbon dioxide gas passing from the lime kiln alternately to the gas phase carbonators, and calcium oxide passing to the lime section of the ammonia distiller. Any excess gas produced in the lime kiln is allowed to escape to the atmosphere or may be otherwise utilized. As indicated by the dotted lines and the dot-and-dash line going from the lime kiln to the two carbonators respectively, the carbon dioxide gas from the lime kiln passes to the right hand carbonator during one half of the cycle, and to the left hand carbonator during the other half. When the gas is passing to the right hand carbonator, brine from the washer passes to the left hand carbonator where it dissolves a previously formed deposit of ammonium carbonate with a greater or less quantity of ammonium carbamate depending upon the amount of moisture present in the gases and contained in the chamber where the deposit is formed. Thus, while a deposit is being formed in the right hand carbonator, the deposit previously formed in the left hand carbonator is dissolved and passed in the form of a solution of ammonium carbonate to the bicarbonator. In the other half cycle, gas flows to the left hand carbonator as indicated by the dot-and-dash line, while brine flows from the washer to the right hand carbonator, as also indicated by the dot-and-dash line. It will be understood that when the carbon dioxide gas is flowing to either carbonator, ammonia from the ammonia distiller is also flowing to the same carbonator whereby the constituent gases for the formation of ammonium carbonate or carbamate will be present.

In the bicarbonator, strong carbon dioxide gas from the decarbonator, supplemented so far as is necessary by a lean gas from the lime kilns, reacts with ammonium carbonate and sodium chloride to form sodium bicarbonate. In the form of the invention illustrated in Fig. 2, the gas from the decarbonator is supplemented by strong gas from the heater passing through the carbonators 2 and 2a and will require but little if any kiln gas. Ammonium bicarbonate is believed to be formed as an intermediate product. The sodium bicarbonate in the form of a slurry passes to the filter where the solid sodium bicarbonate is separated from the solution and passed to the decarbonator there to be converted into sodium carbonate and a strong carbon dioxide gas which passes back to the bicarbonator as indicated. The liquor from the filter containing ammonium bicarbonate, ammonium chloride and sodium chloride passes to the ammonia distiller which is made up of a heating section labeled "Heater" and a lime section. In the heating section, the ammonium bicarbonate is broken down to yield ammonia and carbon dioxide and in the lime section the ammonium chloride is reacted with lime from the lime kiln. Thus in both sections of the ammonia distiller, ammonia is recovered and together with carbon dioxide resulting from the breaking down of ammonium bicarbonate and with the accompanying water vapor is passed alternately to the gas phase carbonators where the $CO_2$ from the heater is supplemented by enough lean $CO_2$ gas from the lime kiln for the correct proportion to form solid carbonate of ammonia. The inert gas from the lime kiln which does not react in the gas phase carbonators passes to the washer for the recovery of any ammonia content and thence to the atmosphere.

The form of the invention illustrated in Fig. 1a differs from that of Fig. 1 only in that the gases from the heater and the lime section are conducted through separate passages to the carbonator whereby the lime section gas containing no $CO_2$ can be cooled more than the heater gases for reduction of their moisture content.

In Fig. 2 we have shown a flow diagram for a variation of the process illustrated in Fig. 1 wherein we employ two pairs of gas phase carbonators, that pair indicated as 1 and 1a corresponding to the two carbonators of Fig. 1 and those indicated as 2 and 2a being auxiliary thereto for the purpose of obtaining a quantity of strong carbon dioxide gas from the heating section of the ammonia distiller. By recovering this strong gas and passing it to the bicarbonator, we are able to reduce to a minimum the quantity of lean gas necessary to be supplied from the lime kiln to the bicarbonator. The required supply of kiln gas to the bicarbonator, being small, indication thereof has, for clarity of illustration, been omitted from Fig. 2.

It will be observed that lean gas from the lime kiln flows alternately to carbonators 1 and 1a and that ammonium carbonate solution flows alternately from these carbonators to a blending tank. At the same time a mixture of ammonia and carbon dioxide passes from the heater alternately to carbonators 2 and 2a, the ammonium carbonate formed by reaction of ammonia and carbon dioxide from the heater flowing as a solution alternately to the blending tank where it is mixed with the ammonium carbonate solution from carbonators 1 and 1a and passed to the bicarbonator. It will be observed that the ammonia and carbon dioxide passing from the heater to carbonators 2 and 2a is derived principally from the decomposition of ammonium bicarbonate and that therefore the carbon dioxide content is approximately double that required to react with the ammonia content. Accordingly, approximately half of the carbon dioxide, as a strong gas, is freed from ammonia and passed to the bicarbonator to supplement the strong carbon dioxide gas from the decarbonator. Thus, while the process of Fig. 2 requires additional equipment, it avoids the undesirable feature of passing lean carbon dioxide from the lime kiln to the bicarbonator.

It will be noted that by employing the kiln gas in the gas phase reaction where little power is required and the carbon dioxide of high purity from the carbonating furnace in the bicarbonator, substantial savings in power are effected as compared with the usual method of absorbing ammonia in the brine and then treating the resulting solution with the entire quantity of carbon dioxide, necessitating the expenditure of energy for forcing the inert gases through a liquid-gas contact reaction. This method makes unnecessary any special efforts to produce kiln gases of high carbon dioxide content and the cheapest methods of lime burning are available. We also effect substantial savings in the amount of cooling water required since higher temperatures can be used in the formation of the ammonium carbonate and carbamate than those employed in the standard carbonating tower.

This is a continuation in part of our copending application Serial No. 162,462, filed September 4, 1937.

Having thus described our invention, what we claim is:

1. An ammonia-soda process comprising the steps of first, bringing together ammonia and carbon dioxide gases and water vapor in the proportion two mols of ammonia, approximately one mol of carbon dioxide and less than one mol of water, second, cooling the mixture until substantially all the ammonia has combined with carbon dioxide to form ammonium carbonate or ammonium carbamate, third, dissolving the resulting solid in a substantially saturated sodium chloride solution, fourth, contacting the resulting solution with carbon dioxide whereby to produce sodium bicarbonate and ammonium chloride, fifth, separating the solid sodium bicarbonate thus produced from the ammonium chloride liquor, sixth, converting said solid sodium bicarbonate to sodium carbonate and carbon dioxide and returning the carbon dioxide thus produced to the fourth step, and seventh, recovering ammonia and returning the same to the first step.

2. In the combination recited in claim 1, the first two steps being carried out in one reaction chamber for a time and then in another reaction chamber for a time, and the third step following the discontinuance of the second in each reaction chamber, whereby the complete process may be continuously performed.

3. An ammonia-soda process comprising the steps of first, bringing together ammonia and carbon dioxide gases and water vapor in the proportion two mols of ammonia, approximately one mol of carbon dioxide and less than one mol water, second, cooling the mixture until substantially all the ammonia has combined with carbon dioxide to form solid ammonium carbonate or carbamate, third, dissolving the resulting solid in a substantially saturated solution of sodium chloride, fourth, contacting the resulting solution with carbon dioxide to produce sodium bicarbonate, fifth, separating the reaction mixture into a first portion consisting principally of sodium bicarbonate and a second portion containing substantially all the ammonium chloride and unreacted sodium chloride and a material quantity of ammonium bicarbonate, in solution, sixth, converting the sodium bicarbonate to sodium carbonate and carbon dioxide and returning the carbon dioxide to the fourth step, seventh, recovering carbon dioxide from said second portion by heating and returning a part of such carbon dioxide to the fourth step, and eighth, recovering ammonia from the ammonium chloride by addition of $Ca(OH)_2$ and returning the same to the first step.

4. An ammonia-soda process comprising the steps of first, bringing together ammonia and carbon dioxide gases and water vapor in the proportion of approximately two mols of ammonia, one mol of carbon dioxide and less than one mol water, second, cooling the mixture until substantially all the ammonia has combined with carbon dioxide to form solid ammonium carbonate or carbamate, third, dissolving the resulting solid in a substantially saturated solution of sodium chloride, fourth, contacting the resulting solution with carbon dioxide in the proportion of not less than one mol $CO_2$ to two mols $NH_3$, fifth, separating the reaction mixture into a first portion consisting principally of solid sodium bicarbonate and a second portion containing substantially all the ammonium chloride and unreacted sodium chloride and a material quantity of ammonium bicarbonate, in solution, sixth, converting the sodium bicarbonate to sodium carbonate and carbon dioxide and returning the carbon dioxide to the fourth step, seventh, heating said second portion to cause evolution of a mixture of ammonia and carbon dioxide gases, eighth, cooling the last mentioned mixture until substantially all the ammonia therein has been converted to solid ammonium carbonate or carbamate and passing the excess carbon dioxide to the fourth step, and ninth, recovering ammonia from the ammonium chloride and returning the same to the first step.

5. An ammonia-soda process comprising the steps of first, bringing together ammonia and $CO_2$, said ammonia being at a temperature not exceeding that at which ammonia and carbon dioxide form a solid, said carbon dioxide being moist and at a temperature not greatly exceeding 40° C., the proportions of ammonia, carbon dioxide and water vapor being two mols of ammonia, approximately one mol of carbon dioxide and less than one mol water, second, cooling the mixture until substantially all the ammonia has combined with carbon dioxide to form ammonium carbonate or ammonium carbamate, third, dissolving the resulting solid in a substantially saturated sodium chloride solution, fourth, contacting the resulting solution with carbon dioxide whereby to produce sodium bicarbonate and ammonium chloride, fifth, separating the solid sodium bicarbonate thus produced from the ammonium chloride liquor, sixth, converting said solid sodium bicarbonate to sodium carbonate and carbon dioxide and returning the carbon dioxide thus produced to the fourth step, and seventh, recovering ammonia and returning the same to the first step.

CLIFTON N. WINDECKER.
ROBERT E. WINDECKER.